Figure 1:
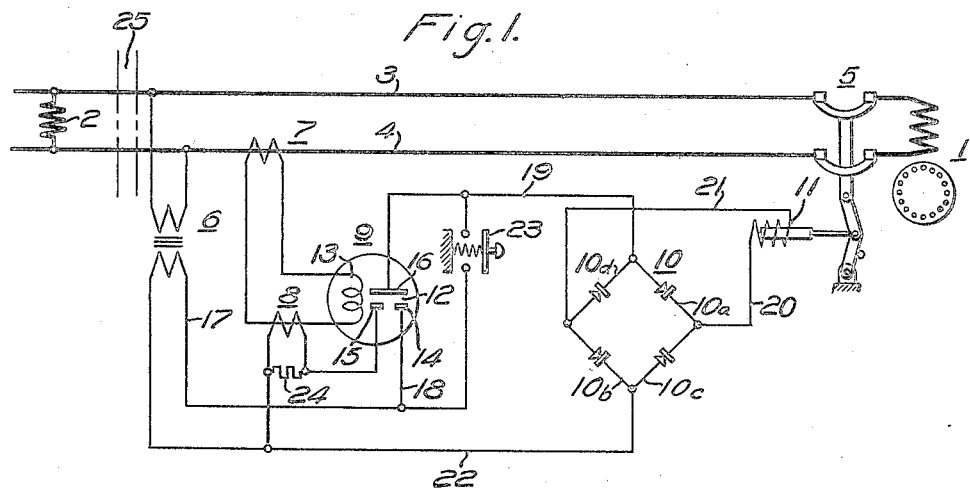

Sept. 24, 1935.    M. W. BRAINARD    2,015,586
PROTECTIVE SYSTEM
Filed Sept. 30, 1932    2 Sheets-Sheet 1

WITNESSES:
R. J. Fitzgerald
Fred C. Wilhoum

INVENTOR
Maurice W. Brainard.
BY
ATTORNEY

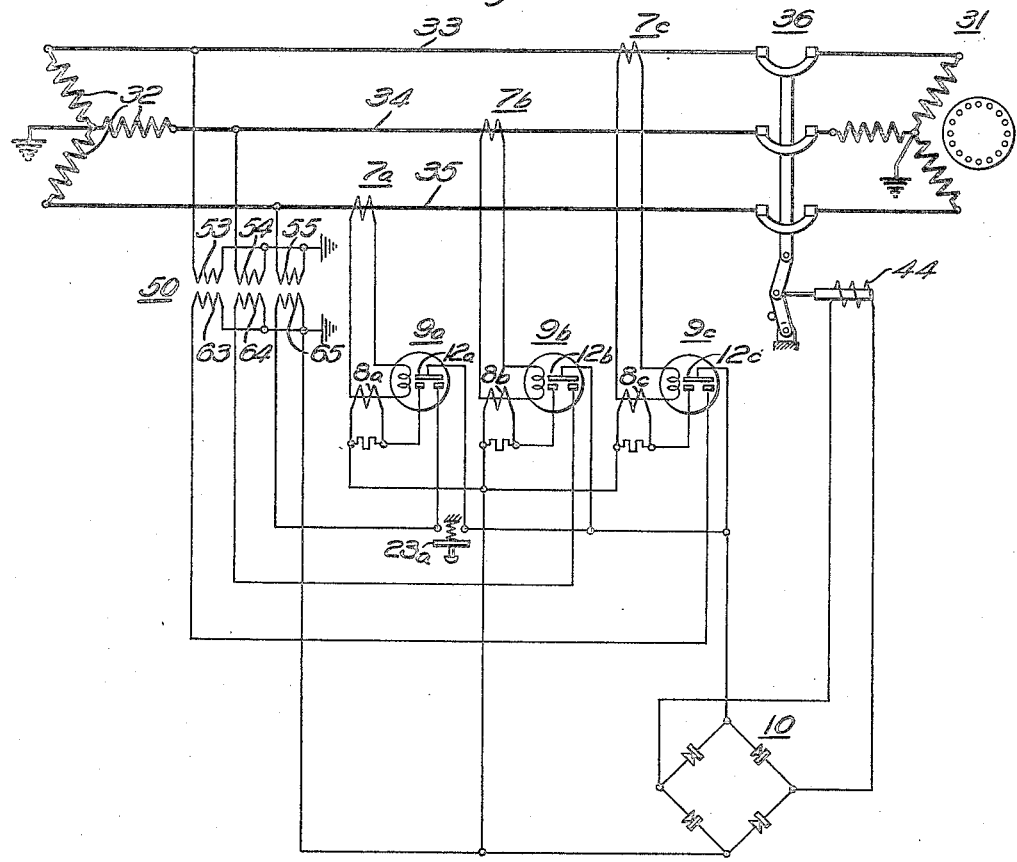

Patented Sept. 24, 1935

2,015,586

UNITED STATES PATENT OFFICE 2,015,586

PROTECTIVE SYSTEM

Maurice W. Brainard, Los Angeles, Calif., assignor to Westinghouse Electric & Manufacturing Company, East Pittsburgh, Pa., a corporation of Pennsylvania Application September 30, 1932, Serial No. 635,548

7 Claims. (Cl. 175—294)

My invention relates to protective systems for electrical circuits and relates particularly to a system for supplying positive tripping power for a circuit-breaker, controlling an electrical circuit, under a wide range of current and voltage conditions of the protected circuit.

At the present time the tripping mechanisms of all large circuit-breakers, circuit-interrupters or circuit-controllers employ direct-current "shunt-trip" solenoids or coils that cannot effect a tripping action when energized from an alternating-current source. The term "shunt-trip" describes the manner of energization of the coils, namely, their connection across the terminals of a voltage supply line.

It has been proposed to employ a suitable rectifier for transforming alternating-current (hereinafter designated A. C.) energy from the circuit controlled by a circuit-breaker to direct-current (hereinafter designated D. C.) energy and to employ the latter for effectively energizing the direct-current "shunt-trip" solenoid of the circuit-breaker. In such a system, whenever an excessive or overload current occurs in one of the supply lines or conductors, the contact members of a protective relay operate to close the circuit through the rectifier and thereby effect the energization of the tripping solenoid. This type of system is suitable only in the event that the source of A. C. potential, in accordance with which the tripping solenoid is energized, is maintained above 60% of its normal value because the tripping solenoid is uniformly so designed that a voltage below 60% normal value is ineffective to effectively energize it. Should the overload current in the circuit be sufficient to cause the voltage across the A. C. source to drop below 60% of its normal value, there would not be enough power supplied to the tripping solenoid to effectively energize it. Therefore, a protective system of this kind is ineffective, in all cases, to effect the interruption of the electrical circuit.

It has also been proposed to employ a suitable current transformer associated with one of the conductors of an A. C. circuit, for operating a rectifier connected to a D. C. tripping coil of a circuit-breaker, controlling the A. C. circuit, whenever an excessive or overload current occurs in one of the lines or conductors of the A. C. circuit.

Such a protective system provides the necessary protection against a short-circuit or heavy overload current but is unable to effect a so-called "shunt-tripping" when there is no overload current or only a slight overload current on the A. C. circuit. Furthermore, such a system will trip only certain small circuit-breakers at a standard five ampere overload.

It will thus be seen that, for most circuit-breakers, there is a range of overload current values between normal current and high excess current over which the latter system is ineffective to cause the tripping of the circuit-breaker.

I propose to employ a system in which a "shunt-trip" solenoid of a circuit-breaker is effectively energized in accordance with the voltage of the A. C. system, controlled by the breaker, except upon the occurrence of very high short-circuit or overload currents in the supply conductors of the A. C. system, at which time suitable current translating or transforming means which I provide is adapted to supply sufficient power necessary to effect the actuation of the tripping solenoid.

It is an object of my invention, therefore, to provide a protective system for A. C. circuits which enables an adequate supply of power to be obtained therefrom for operatively energizing the trip-coils of circuit-interrupters controlling the circuits, whereby the circuits may be interrupted and thus protected under a wide range of conditions of voltage and current therein.

It is another object of my invention to provide a protective system, adaptable to single-phase and polyphase systems, for insuring a supply of D. C. power from the A. C. system for operating a tripping mechanism of a circuit-controller in the A. C. system under a wide range of conditions of voltage and current therein.

Figure 2:
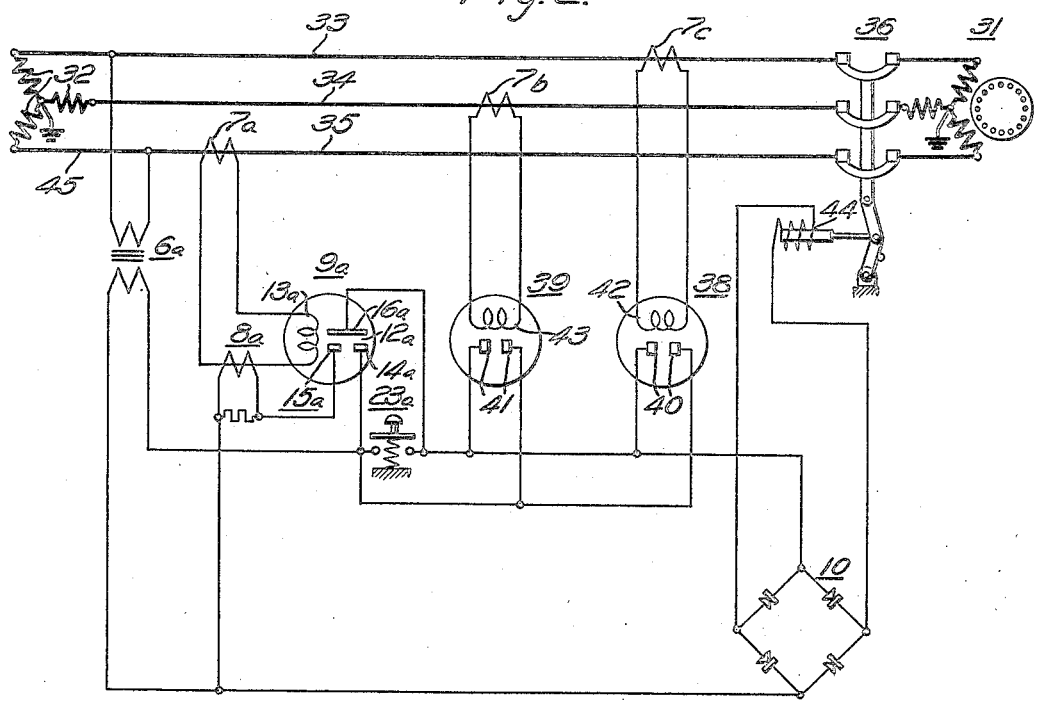

Other objects of my invention will be apparent from the following description and explanation of the operation of my invention when read in connection with the accompanying drawings, in which Figure 1 is a diagram illustrating one embodiment of my invention as applied to a single-phase electrical circuit;

Fig. 2 is a diagram showing another embodiment of my invention applied to a polyphase system, and Fig. 3 is a diagram showing a modification of the embodiment illustrated in Fig. 2.

Referring to Fig. 1, an A. C. circuit is shown comprising a generator 1 of any suitable type, an electrical load represented by the resistance 2, conductors 3 and 4, and a circuit-interrupter 5 of any suitable type.

The principal elements comprising the protective system constituting my invention are a suitable potential transformer 6 having the terminals of its primary winding connected across conductors 3 and 4, a suitable current transformer 7 of any suitable type having its primary winding in series with one of the conductors, such as conductor 4, another current transformer 8 of suitable character having its primary winding in series with the secondary winding of transformer 7, a protective relay 9, and a suitable rectifier 10, preferably of a dry type, such as a copper-oxide disc type.

It should be understood that, although I prefer to employ the rectifier 10, its employment is not absolutely essential. In other words, a tripping coil 11, which I have provided for the circuit-controller 5, may be readily adapted to operate upon A. C. energization without the necessity of interposing a rectifier 10 for translating A. C. energy to D. C. energy as illustrated in the figure. It should be understood also that the current transformers may be of the so-called "through-type", having no primary winding but having a single conductor inserted axially through a secondary winding.

The protective relay 9 is of any suitable type which is operably responsive to a predetermined current in one of the conductors, such as conductor 4, to close a contact member 12, an actuating coil 13 thereof being connected in series with the secondary winding of the current transformer 7.

The contact member 12 of relay 9 comprises two separate contacts 14 and 15 which engage a common contact member 16.

The engagement of contact members 14 and 16 completes a circuit connecting the rectifier 10 and the trip-coil 11 in series with the secondary winding of the potential transformer 6. The rectifier 10 is of a full-wave type and thus the energizing circuit for the trip-coil 11 is different for successive half-cycles of voltage supplied from the transformer 6. During one half-cycle of voltage, current flows from the secondary winding of the transformer 6 through conductors 17 and 18, contact members 14 and 16 of relay 9, conductor 19, arm 10a of rectifier 10, conductor 20, trip-coil 11 of controller 5, conductor 21, arm 10b of rectifier 10 and returns by conductor 22 to the secondary winding of transformer 6. During the next half-cycle of voltage, current flows from the secondary winding of the transformer 6, through conductor 22, arm 10c of rectifier 10, conductor 20, trip-coil 11 of controller 5, conductor 21, arm 10d of rectifier 10, conductor 19, contact members 16 and 14 of relay 9 and returns to the secondary winding of transformer 6 through conductors 18 and 17.

The engagement of contact members 15 and 16 of relay 9 completes a similar circuit for connecting the secondary winding of current transformer 8 in series with the rectifier 10 and the trip-coil 11. This circuit is deemed sufficiently obvious and clear to preclude the necessity for tracing it in detail.

A manually operated switch, such as switch 23, is normally biased to an open position and manually operable to close a circuit against the force of the biasing means, and is connected in parallel with contact members 14 and 16 of relay 9 for the purpose of completing the circuit previously traced connecting the trip-coil 11 of controller 5 and rectifier 10 in series with the secondary winding of transformer 6, whereby the circuit-controller 5 may be manually tripped, if desired.

A suitable resistor 24 having a high resistance is connected in shunt relation with the secondary winding of current transformer 8 for the purpose of allowing a slight current leakage therethrough and thereby preventing the building up of a dangerous voltage across the terminals of the secondary winding of transformer 8.

The operation of the foregoing embodiment of my invention should be readily understood from the above description. It will be clear that whenever a slight overload current occurs in either of the conductors 3 or 4, the engagement of contact members 14 and 16 of relay 9 completes the circuit previously traced whereby the trip-coil 11 of controller 5 is effectively energized from transformer 6 to cause the circuit-controller 5 to be operated to disconnect conductors 3 and 4 from the generator terminals and thus interrupt the circuit. The overload current being small, the voltage across the secondary winding of potential transformer 6 is sufficient to effectively energize the trip-coil 11.

In the event that a short-circuit connection occurs somewhere in the circuit between the circuit-controller 5 and the load 2, such as in the zone 25, resulting in a heavy overload current flowing in conductors 3 and 4, the tripping transformer 8 is effective to supply the necessary current and power to effectively energize the trip-coil 11 of controller 5, even though the voltage across the secondary winding of transformer 6 is insufficient to do so because of the major decrease in the amount thereof as a result of the heavy current in the conductors.

In Fig. 2, I have shown another embodiment of my invention as applied to a polyphase grounded A. C. system, such as the three-phase grounded system shown, comprising a three-phase generator 31 of any suitable type having a grounded neutral, a three-phase load represented by the Y-connected resistances 32 having the neutral point thereof grounded, conductors 33, 34 and 35 connecting the generator 31 to the load 32 and a circuit-controller 36 having switch members in series-circuit relation with each of the conductors 33, 34 and 35.

The protective system constituting my invention and operable in connection with such a three-phase grounded system, comprises a potential transformer 6a having its primary winding connected across two of the phase conductors, such as conductors 33 and 35, a current transformer 7a having its primary winding connected in series-circuit relation with one of the conductors, such as conductor 35, a current transformer 7b having its primary winding connected in series-circuit relation with one of the remaining conductors, such as conductor 33, a current transformer 7c having its primary winding connected in series-circuit relation with the other remaining conductor 34, a current transformer 8a having its primary winding connected in series-circuit relation with the secondary winding of current transformer 7a, three protective relays 9a, 38 and 39 and a rectifier 10 similar to the rectifier 10 of Fig. 1.

Relay 9a is similar to relay 9 shown in Fig. 1 and comprises an actuating coil 13a connected in series-circuit relation with the secondary winding of current transformer 7a and operably responsive to a predetermined current in conductor 35 to effect the closing of a double contact switch member 12a. The switch member 12a comprises two separate contact members 14a and 15a which simultaneously engage a common contact member 16a in response to the actuation thereof by coil 13a.

Relays 38 and 39 are similar to relay 9a except that they are provided with single contact switch members 40 and 41, respectively. Relay 38 is provided with an actuating coil 42 which is connected in series-circuit relation with the secondary winding of current transformer 7c associated with conductor 33.

Relay 39 is provided with an actuating coil 43 which is connected series-circuit relation with the secondary winding of current transformer 7b associated with conductor 34.

Thus it will be seen that contact members 40 of relay 38 are actuated into engagement upon the occurrence of a predetermined current in conductor 33 and that contact members 41 are actuated into engagement in response to the occurrence of a predetermined current in conductor 34.

A manually operable switch 23a, similar to switch 23 shown in Fig. 1, and contact members 40 and 41 are connected in parallel relation with each other and with contact members 14a and 16a of relay 9a.

Circuit-controller 36 is provided with a trip-coil 44 of such design that it is effectively energizable to trip the controller and thereby effect the disconnection of the load 32 from the generator 31 in response to a phase-to-ground voltage, as well as in response to a phase-to-phase voltage. Since the phase-to-ground voltage of the three-phase system shown in Fig. 2 is approximately 58% of the phase-to-phase voltage, such as that across conductors 33 and 35 and impressed on the primary winding of the potential transformer 6a, trip-coil 44 must be so designed and adapted that it will be effectively energized in response to the imposition thereon of a voltage which is substantially 58% of the voltage across the secondary winding of potential transformer 6a. The exact purpose of so designing the trip-coil 44 will appear hereinafter.

It will be observed that the potential transformer 6a and the current transformer 7a cooperate to supply the necessary power for effectively energizing the trip-coil 44 by means of circuit connections which are practically identical with those traced in connection with Fig. 1 and it is, therefore, deemed unnecessary to trace these circuits in detail.

The operation of the protective system constituting the embodiment of my invention illustrated in Fig. 2 is best understood by assuming a few hypothetical instances. Let it be assumed that for some reason a slight over-current occurs in conductor 35. Relay 9a, which is operably responsive to the slight over-current in conductor 35, is actuated to effect the engagement of contact members 14a and 15a with contact member 16a, and the circuit for energizing trip-coil 44 of controller 36 is completed, the substantially full voltage across the secondary winding of transformer 6a being effective to energize the coil 44 and trip the circuit-controller 36.

Assume that a short-circuit to ground occurs at some point on conductor 35, such as at the point 45. Obviously, a high overload current then flows in conductor 35 which is effective to cause relay 9a to close its contact members, the current transformer 8a being effective to supply power for energizing the trip-coil 44. In this case, both the current transformer 7a and the potential transformer 6a are effective to energize the trip-coil 44. Clearly, the potential impressed on the primary winding of transformer 6a under the condition assumed, namely, a short-circuit to ground connection on conductor 35, is that of a single phase, in other words, the voltage between conductor 33 and ground. Thus the reduction in the voltage across the secondary winding of the transformer 6a is not sufficient to render the voltage supply ineffective to energize the trip-coil 44.

Assume, however, a short-circuit connection between conductors 33 and 35. Obviously, although the voltage supplied from the secondary winding of the transformer 6a is substantially zero, the current transformers 7a and 8a are effective to supply adequate power to energize the trip-coil 44.

A short-circuit to ground occurring on conductor 33 causes the relay 38 to close its contact members and connect the secondary winding of the transformer 6a in series-circuit relation with the trip-coil 44 which is, therefore, effectively energized to trip the circuit-controller 36. It will be observed that the voltage impressed on the primary winding of transformer 6a is only the voltage between conductor 35 and ground, and that it is only the voltage across a single-phase winding. It will thus be clear that trip-coil 44 is especially designed to be effectively energizable upon the imposition of a substantially 58% normal voltage in order to effect complete protection. Clearly, in this case just assumed, the current transformers 7a and 8a are ineffective to effectively energize trip-coil 44, upon the occurrence of a short-circuit to ground connection on conductor 33, because no high excess current flows in conductor 35.

Assume further a short-circuit to ground connection on conductor 34. Relay 39, being operably responsive to a predetermined current in conductor 34, is thus actuated to close its contact members 41. The voltage impressed on the primary winding of transformer 6a is substantially unaffected by the high overload current in conductor 34 and thus the full voltage across the secondary winding of transformer 6a is effective to energize trip-coil 44. Obviously, such is also the case in the event of a slight overload current in conductor 34.

In the event of short-circuit connections between conductors 33 and 34 or between conductors 34 and 35, the secondary voltage supplied by transformer 6a is still substantially 58% of its normal voltage and thus, under these conditions, the trip-coil is effectively energized.

A preferred embodiment of my invention as applied to a three-phase grounded system is illustrated in Fig. 3. The A. C. system shown in Fig. 3 corresponds to that shown in Fig. 2 and the same elements thereof are identically designated.

The protective system shown in Fig. 3 comprises a three-phase potential transformer 50, three current transformers 7a, 7b and 7c similar to the corresponding transformers shown in Fig. 2, three current transformers 8a, 8b and 8c having their primary windings connected in series-circuit relation with the secondary windings of transformers 7a, 7b and 7c, respectively, and three protective relays 9a, 9b and 9c.

A rectifier 10 and a trip-coil 44 for circuit controller 36 corresponding to the rectifier and trip-coil shown in Fig. 2 are also provided.

The potential transformer 50 is provided with three primary phase-windings 53, 54 and 55 which have one of their terminals connected, respectively, to conductors 33, 34 and 35, the other terminal of each winding being connected to that of the other windings and grounded.

The secondary phase-windings 63, 64 and 65 of transformer 50 are inductively coupled, respectively, to the primary windings 53, 54 and 55 and have one terminal of each winding connected to the corresponding terminal of the others and grounded.

Relays 9b and 9c are similar to relay 9a, previously described, and each is provided with a double contact switch member 12b and 12c, respectively, for completing two different circuits.

As will be readily seen from Fig. 3, relays 9a, 9b and 9c are operably responsive, respectively, to predetermined currents in conductors 35, 34 and 33, the actuating coils thereof being connected, respectively, in series-circuit relation with the secondary winding of current transformers 7a, 7b and 7c.

The primary windings of the current transformers 8a, 8b and 8c are connected in series-circuit relation, respectively, with the secondary windings of current transformers 7a, 7b and 7c and the actuating coils of relays 9a, 9b and 9c, respectively.

The closing of the switch member 12a of relay 9a completes a circuit for connecting in series-circuit relation the secondary winding of the current transformer 8a, the rectifier 10 and the trip-coil 44 by a circuit substantially similar to that traced in Fig. 1. The closing of switch member 12a of relay 9a also completes a circuit for connecting the secondary phase-winding 65 of transformer 50 in series-circuit relation with the rectifier 10 and trip-coil 44.

Similarly, the closing of switch member 12b of relay 9b completes two different circuits associating the current transformer 8b and the secondary phase-winding 64 of transformer 50 with the rectifier 10 and the trip-coil 44. Similarly, also, the closing of switch member 12c of relay 9c completes two different circuits for associating current transformer 8c and secondary phase-winding 63 of transformer 50 with the rectifier 10 and the trip-coil 44.

Thus it will be seen that in the system shown in Fig. 3, the trip-coil 44 is adapted to be energized in accordance with the voltage and current in each phase winding of the generator 31 and that an in-phase relation between the current supplied by the current transformers 8a, 8b and 8c and the corresponding voltages supplied from the secondary phase windings 65, 64 and 63, respectively, is effected.

A manually operated switch 23a is also provided, as in Fig. 2, for effecting a manual trip of the circuit controller 36 by connecting the secondary phase winding 65 of transformer 50, the rectifier 10 and the trip-coil 44 in series-circuit relation.

Trip-coil 44 is of substantially the same design as trip-coil 44 in Fig. 2, because it is effectively energizable by the imposition of a voltage thereon which is as low as 58% of the normal translated phase-to-phase voltage.

The operation of this embodiment of my invention may best be understood by a few assumed instances. Assuming a slight overload in any of the phase conductors 33, 34 and 35, the corresponding protective relays 9c, 9b and 9a are respectively actuated to close their switch members and thereby effect the connection of secondary phase windings 63, 64 and 65, respectively, in series-circuit relation with the rectifier 10 and the trip-coil 44 whereby the circuit-controller 36 is caused to interrupt the connection of the conductors to the generator terminals.

In the event of a high overload current, such as would be caused by a short-circuit to ground occurring on any of the conductors 33, 34 and 35, the current transformers 8c, 8b and 8a are respectively effective to supply adequate power for effectively energizing trip-coil 44, although the voltage across the corresponding secondary phase-windings 63, 64 and 65 is reduced substantially to zero.

In the event of a short-circuit connection between any two of the phase conductors 33, 34 and 35, or in the event of a three-phase fault occurring, that is, all three of the phase conductors being connected together or to ground, in which case the voltages across the secondary windings of the potential transformer 50 are reduced substantially to zero, the corresponding current transformers 8a, 8b and 8c either jointly or altogether supply current for effectively energizing trip-coil 44.

It will thus be seen that I have provided a protective system for A. C. circuits which enables an adequate supply of power to be obtained therefrom for operatively energizing the trip-coils of circuit-interrupters controlling the circuits, whereby the circuits may be interrupted and thus protected under a wide range of conditions of voltage and current therein.

It should be understood that my invention is not limited to the specific embodiments shown and described but that it is capable of various modifications without departing from the spirit thereof. I do not mean to limit my invention, therefore, except as necessitated by the scope of the prior art and except as defined in the appended claims.

I claim as my invention:

1. In protective apparatus for an electric circuit, a circuit breaker having a trip coil, means for energizing said trip coil in accordance with a resultant sum of a voltage condition of said circuit and a current condition thereof, and relay means responsive to an abnormal condition of said circuit for controlling said last-mentioned means, whereby adequate power is available for energizing said trip coil under fault conditions involving low values of current and under fault conditions involving low values of voltage and high values of current.

2. In protective apparatus for an alternating-current circuit, a circuit breaker having a trip coil, a potential transformer energized in accordance with a voltage condition of said circuit, a current transformer energized in accordance with a current condition of said circuit, means including electrical connections between said transformers and said trip coil for energizing said trip coil in accordance with a resultant sum of said voltage and current conditions, and relay means responsive to an abnormal condition of said circuit for controlling said connections, whereby adequate power is available for energizing said trip coil under fault conditions involving low values of current and under fault conditions involving low values of voltage and high values of current.

3. In protective apparatus for an electric circuit, a circuit breaker having tripping means, relay means for controlling the energization of said tripping means, and energizing means for said tripping means effective in accordance with a voltage condition of said circuit when said voltage condition is of substantially normal value and effective in accordance with a current condition of said circuit when said voltage condition is of abnormally low value.

4. In protective apparatus for an alternating-current circuit, a circuit breaker having a normally deenergized trip coil, means including a shunt trip circuit for energizing said trip coil in accordance with a voltage condition of said circuit, relay means for completing said shunt trip circuit in response to an abnormal condition of said alternating-current circuit, a current transformer in said alternating-current circuit, and means effective during an abnormal condition of said alternating-current circuit for circulating a current derived from said transformer through said trip coil.

5. In protective apparatus for an alternating-current circuit, a circuit breaker having a direct-current trip coil, a potential transformer energized in accordance with a voltage condition of said circuit, a current transformer energized in accordance with a current condition of said circuit, rectifying means, conductors completing a trip circuit including said trip coil, both of said transformers in additive relationship and said rectifying means, and relay means responsive to an abnormal condition of said alternating-current circuit for controlling said trip circuit, whereby adequate power is available for energizing said trip coil under fault conditions involving low values of current and under fault conditions involving low values of voltage and high values of current.

6. In protective apparatus for a polyphase alternating current circuit having a plurality of phase conductors, a circuit breaker having a trip coil, a potential transformer energized in accordance with a voltage between predetermined points of said circuit including a selected one of said conductors, a plurality of current transformers energized in accordance with phase currents of said circuit including a selected current transformer energized in accordance with the current in said selected conductor, means responsive to a predetermined abnormal condition of said circuit involving said selected conductor for circulating a current derived from said selected current transformer through said trip coil, and means responsive to other predetermined abnormal conditions of said circuit for applying a voltage derived from said potential transformer to said trip coil.

7. In protective apparatus for a polyphase alternating-current circuit having a plurality of phase conductors, a circuit breaker having a trip coil, a potential transformer energized in accordance with a voltage between predetermined points of said circuit including a selected one of said conductors, a plurality of current transformers energized in accordance with phase currents of said circuit including a selected current transformer energized in accordance with the current in said selected conductor, means responsive to an overcurrent condition of said selected conductor for circulating a current derived from said selected current transformer through said trip coil, and means responsive to other overcurrent conditions of said circuit for applying a voltage derived from said potential transformer to said trip coil.

MAURICE W. BRAINARD.